United States Patent [19]
Erickson et al.

[11] 4,380,875
[45] Apr. 26, 1983

[54] WHEEL ALIGNMENT APPARATUS AND METHOD

[76] Inventors: Lowell H. Erickson, 1495 S. Steele St., Denver, Colo. 80210; Marcellus S. Merrill, 678 Lafayette, Denver, Colo. 80218; David Chrisp, 7705 Walker Dr., Littleton, Colo. 80123

[21] Appl. No.: 396,422

[22] Filed: Jul. 8, 1982

Related U.S. Application Data

[63] Continuation of Ser. No. 172,988, Jul. 28, 1980, abandoned.

[51] Int. Cl.³ .................................................. G01B 5/255
[52] U.S. Cl. .................................................. 33/203.13
[58] Field of Search ................ 33/203, 203.12, 203.13, 33/203.14

[56] References Cited

U.S. PATENT DOCUMENTS 3,187,440 6/1965 Merrill et al. .................... 33/203.12

OTHER PUBLICATIONS

The Merril Dynamic Aligner, K57011, by Merril Engineering Laboratories, Aug. 8, 1979.

Primary Examiner—William D. Martin, Jr.

[57] ABSTRACT

A wheel alignment apparatus and method are provided for use in aligning the front wheels of a vehicle. The wheel alignment apparatus includes a dynamic wheel aligner which determines the dynamic toe angle and dynamic camber angle of a wheel using the axial displacement of rolls upon which each front wheel is rotatable. The wheel alignment apparatus stores these dynamically determined values and stops the rotation of the rolls. After predetermined time delays, an alignment operator makes adjustments to the toe and camber angles of the wheel so that these angles are within a desired range. The changes in the toe angle and camber angle during alignment are determined by the apparatus and combined with the dynamically determined toe and camber angles. As a result, the alignment operator continuously has a visual indication of the toe and camber angles during alignment. The wheel alignment apparatus also removes unwanted changes in the tow angle which occur during the predetermined time delays so that the visual indication accurately reflects the dynamic toe angle.

11 Claims, 8 Drawing Figures

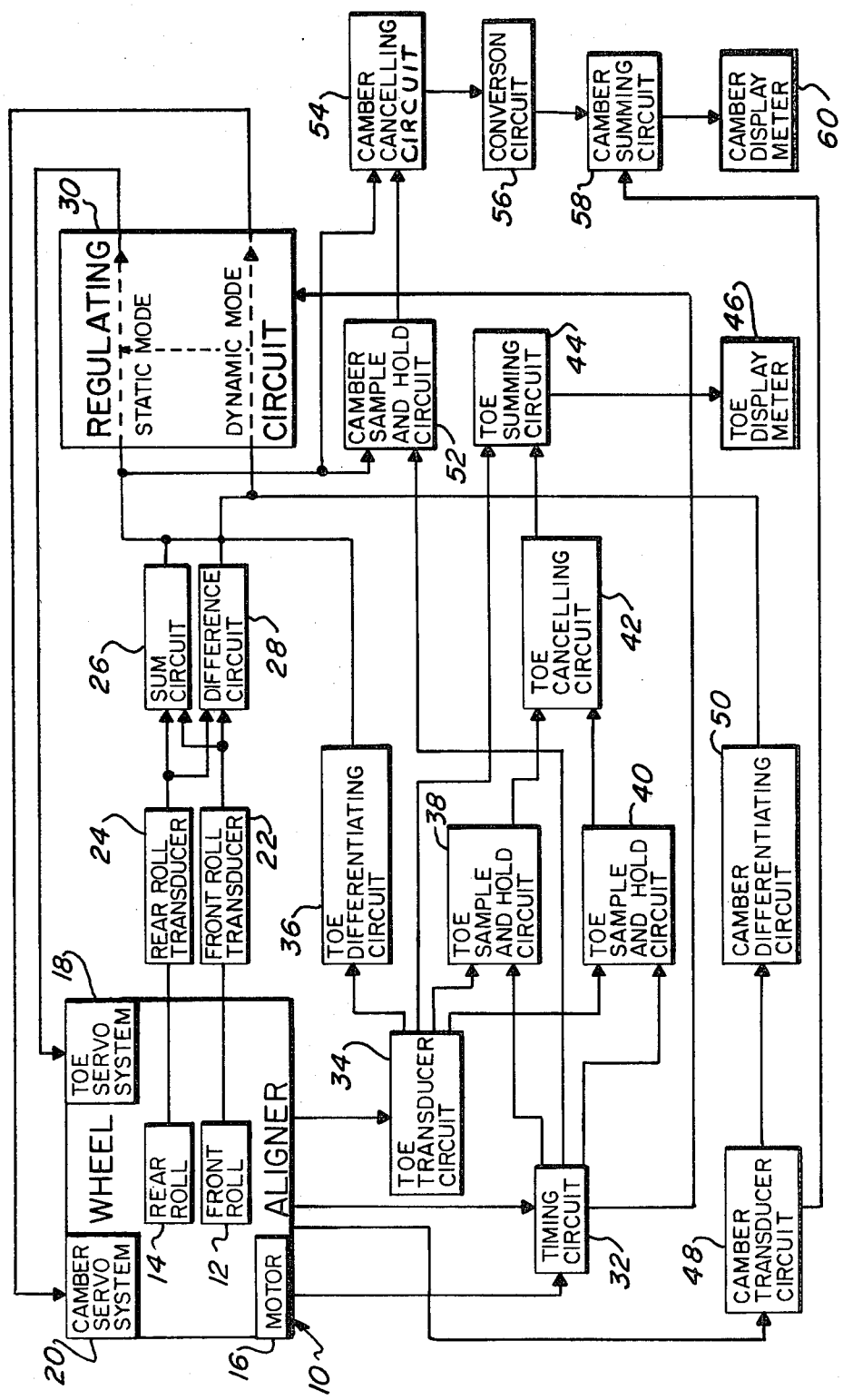
Fig._1

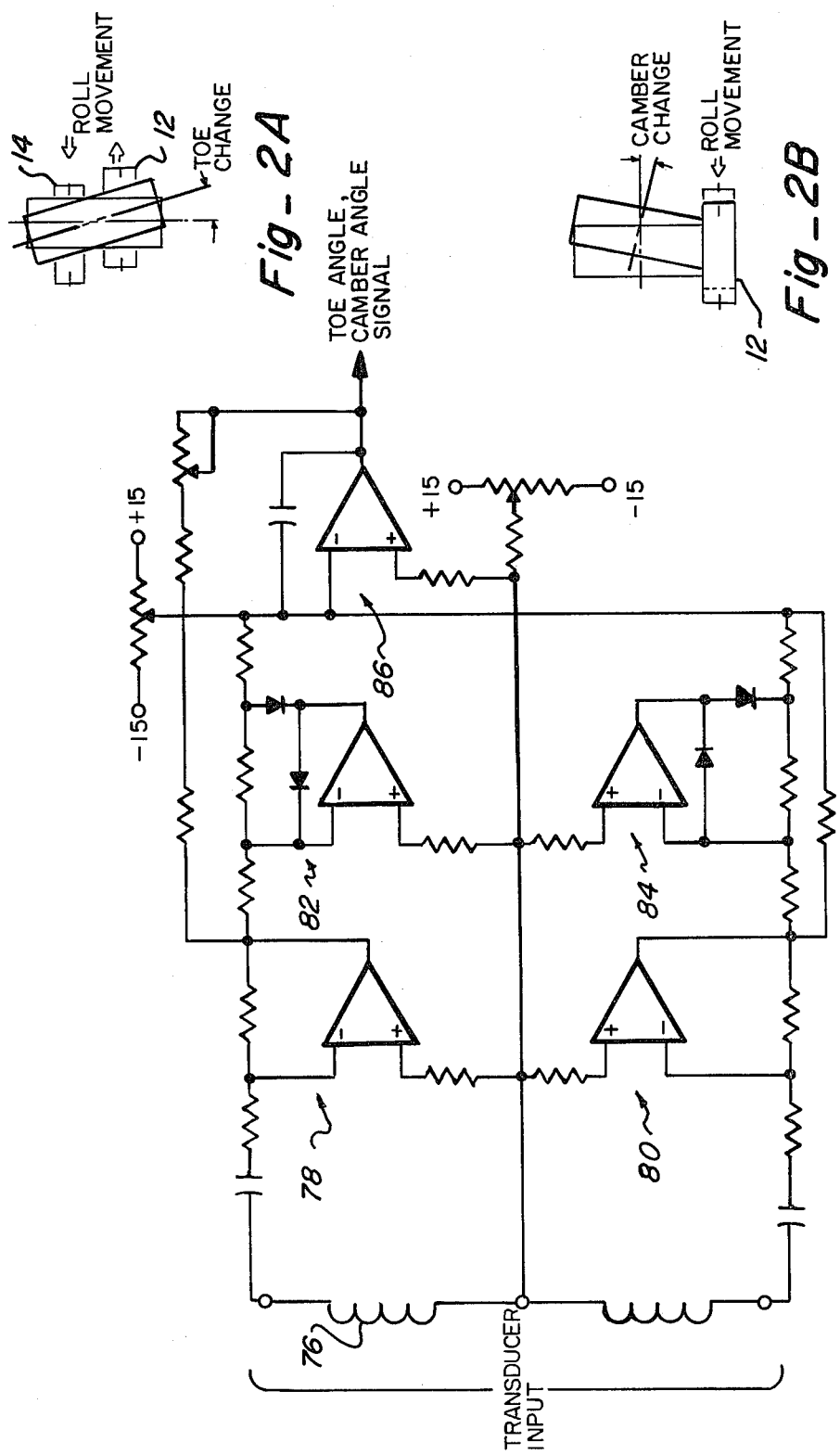

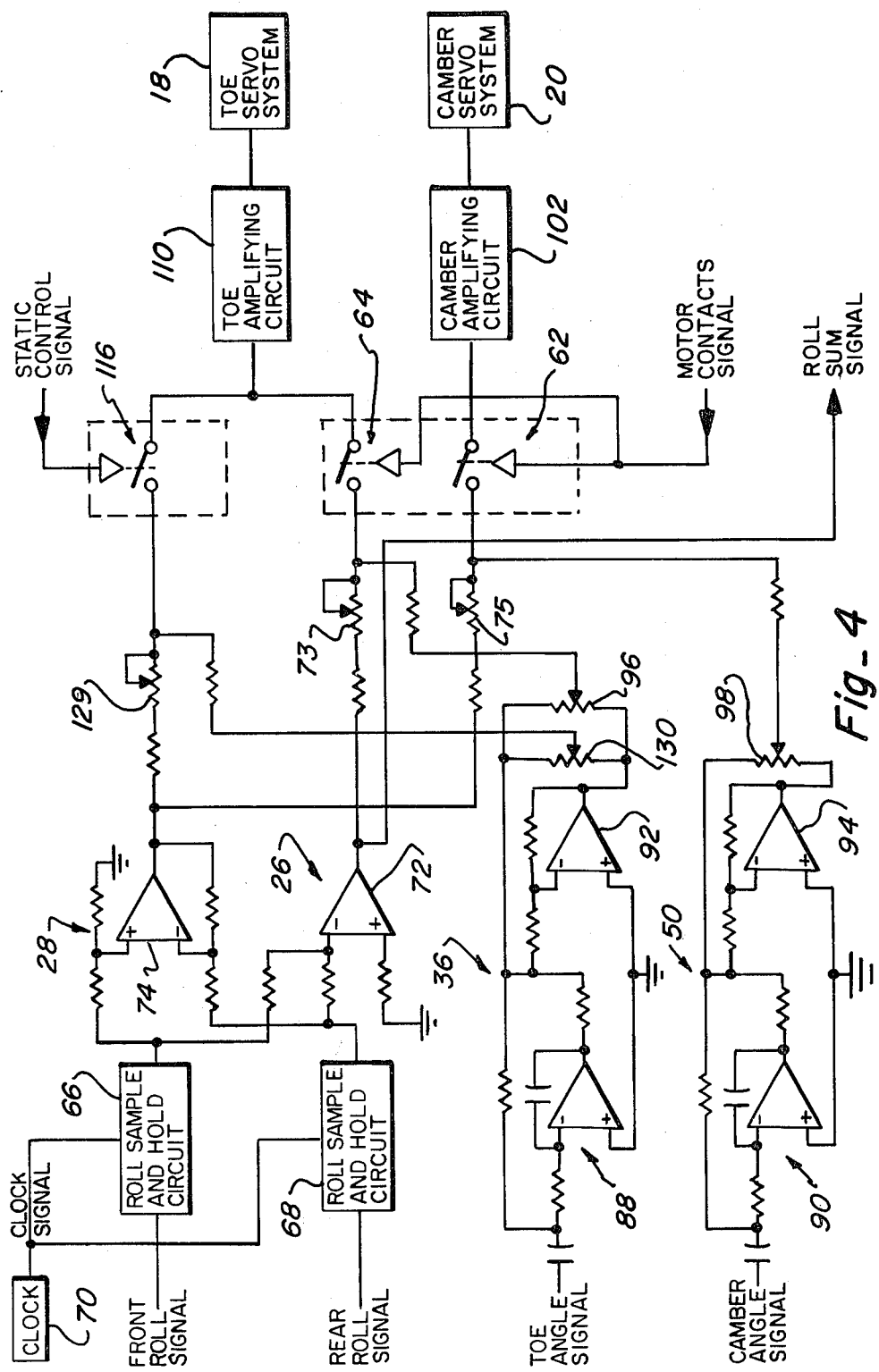

WHEEL ALIGNMENT APPARATUS AND METHOD

This is a continuation, of application Ser. No. 06/172,988, filed July 28, 1980, now abandoned.

FIELD OF THE INVENTION

The present invention relates to an apparatus and a method for aligning the wheels of a vehicle and, specifically, to an apparatus and a method for aligning a non-rotating wheel using toe and camber angles dynamically determined while the wheel was rotating.

BACKGROUND ART

In U.S. Pat. No. 3,187,440, entitled "Dynamic Wheel Alignment Testing Apparatus", and assigned to the same assignee as the present invention, a wheel testing apparatus is described for determining various interrelated angles pertinent to the alignment of the front suspension of a vehicle. The dynamic testing apparatus described therein includes at least a front roll and a rear roll on which a vehicle wheel is placed. The rolls are rotated and the rotation thereof rotates the wheel and tire. Each of the rolls is movable along its axis according to forces applied by the rotating wheel on the rolls. These axial wheel forces are directly proportional to the toe angle and camber angle of the wheel. Toe-in may be broadly defined as the inward slanting of the wheel toward the front. Camber may be broadly defined as the inward sloping of the wheel toward the bottom. The axial displacement of the rolls due to the wheel forces is then coupled to rotary hydraulic valves which control a hydraulic, closed loop servo system. The servo system hydraulics rotates the testing apparatus about a vertical axis in the determination of the toe angle and tilts the top frame of the testing apparatus about a horizontal axis in the determination of the camber angle of the wheel. The testing apparatus or its top frame are rotated or tilted until the forces on the rolls equal zero. The amount of rotation of the testing apparatus about a vertical axis is directly related to the toe angle of the wheel. The amount of rotation of the testing apparatus about the horizontal axis is directly related to the camber angle of the wheel. Transducers for sensing the position of the wheel testing apparatus are mounted thereon and are connected to display meters through suitable electronic hardware.

The wheel testing apparatus of U.S. Pat. No. 3,187,440 accurately determines the toe angle and camber angle of a vehicle wheel. If the angles are not within the manufacturer's specifications, an alignment operator can adjust the toe angle or camber angle while the rolls and wheel are rotating and by observing the changes on the display meters until the toe angle and camber angle are within the proper range. This method of alignment is generally satisfactory. However, the manufacture and use of front wheel drive vehicles has significantly increased. The front wheel drive system, in contrast to the rear wheel drive, does not afford the same amount of space for the alignment operator to make any necessary toe and camber adjustments. As a consequence, an alignment operator, who is adjusting the toe and camber angles of a front wheel drive system, is not afforded the same degree of safety. In order to maximize safety, the present invention is provided to enable the operator to adjust pertinent wheel angles of the vehicle while the rolls are stopped. The alignment operator need not be concerned about the moving rolls while adjusting the toe and camber angles in the relatively less space provided in a front wheel drive vehicle.

Generally speaking, it is not uncommon to align the front wheels of a vehicle while the wheels are not rotating. This method of alignment can be defined as static alignment, in direct contrast to the dynamic mode of determining wheel angles are disclosed in U.S. Pat. No. 3,187,440. It is, however, recognized that there are significant differences between the alignment of a wheel in its static mode versus its dynamic mode. In addition, the dynamic mode of determining wheel angles provides a more worthwhile indication of the vehicle alignment. Based on these premises, the dynamic mode of alignment was conceived. The present invention further improves the dynamic wheel alignment capability by combining the dynamic mode of determining the appropriate wheel angles with a static mode of setting or aligning the front wheels so that the toe angle and camber angle are within the desired range.

SUMMARY OF THE INVENTION

In accordance with the present invention, an apparatus is provided in combination with a dynamic wheel aligner for enabling an alignment operator to set the wheel angles of the front wheels while each wheel is not rotating but still using the wheel angles determined by the dynamic wheel aligner while each wheel was rotating. The dynamic wheel aligner discussed herein is essentially the alignment testing apparatus disclosed in U.S. Pat. No. 3,187,440. Through experimentation, it was observed that, when the dynamic aligner rolls were stopped after rotating, any change in the toe angle of the wheel as a result of the operator's alignment caused the two rolls upon which the wheel was placed to move axially in opposite directions. In addition, it was observed that any change in the camber angle of the wheel as a result of the operator's alignment caused the two rolls to move axially in the same direction. These axial movements of the rolls in the static mode, wherein "static" indicates that the rolls are not rotating, are directly opposite the axial movements found in the dynamic mode, wherein "dynamic" indicates that the rolls are rotating. The is to say, in the dynamic mode, any movement of the two rolls in the same axial direction due to axial tire forces indicates the application of toe forces to the rolls. Similarly, in the dynamic mode, any axial movement of the two rolls in opposite directions due to axial tire forces indicates the application of camber forces to the rolls.

The present invention implements the foregoing observations to permit static alignment of a vehicle wheel after its toe angle and camber angle have been dynamically determined. After determining the toe and camber angles of the wheel dynamically, the motor driving the rolls is deactivated. The apparatus stores or holds the dynamic toe and camber angles in sample and hold circuits. Concurrently with the motor deactivation, a time delay is initiated to permit the wheel and rolls to stop rotating prior to alignment by the operator. The time delay also enables the servo system of the dynamic aligner to settle. The servo system produces a change in the value of the dynamic toe angle of the wheel while the rotation of the rolls is stopped. This change would introduce inaccuracies in the toe angle and must be compensated for in order to determine the proper toe angle. Consequently, the apparatus of the present invention electronically removes this unwanted change in the toe angle. After the time delay and removal of the unwanted toe angle change, the dynamic toe and camber angles are accurately indicated on their respective display meters. The alignment operator then adjusts the toe angle and camber angle so that they are within the desired range. The change in toe angle due to alignment is reflected by the axial movement of the rolls in opposite directions. This change is applied to dynamic wheel aligner servo valves which, in turn, control the hydraulics of the dynamic aligner to cause the aligner to rotate about a substantially vertical axis. Since the axial wheel forces are directly proportional to the toe angle, the toe angle after adjustment is determined by sensing the position of the dynamic aligner. Hence, the dynamic toe angle is combined with the change in the toe angle because of adjustment to provide the operator with an indication of the set or aligned toe angle. The change in camber angle is reflected by the axial movement of the rolls in the same direction. Based on experimentation and observation, it has been observed that the camber angle change by means of adjustment in the static mode is indicated by the axial displacement of the rolls. The axial displacement of the rolls is substantially linearly related to the camber angle change. The apparatus combines the dynamic camber angle and the change in camber angle reflected by the axial displacement of the rolls during the static alignment to provide an indication to the operator of the set or aligned camber angle of the wheel.

In view of the foregoing, a number of worthwhile advantages of the present invention are readily observed. An apparatus is provided in combination with a dynamic wheel aligner to enable a vehicle wheel to be aligned when the wheel is not rotating but still using dynamically determined wheel angles. The apparatus combines the desirable features of dynamic wheel alignment with the relatively safer aspect of static wheel alignment. Particularly where the vehicle is a front wheel drive system in which there is reduced space for operator maneuverability, the present invention minimizes the hazards involved in wheel alignment since the vehicle wheels are not rotating while the operator is adjusting the toe and camber angles of the wheel. Additional advantages of the present invention will become readily apparent from the following discussion when taken in conjunction with the accompanying drawings.

BRIEF DESCRIPTION OF THE DRAWINGS

FIG. 1 is a block diagram illustrating the present invention in combination with the dynamic wheel aligner;

FIG. 2A is a diagrammatic plan view illustrating the effect of axial wheel forces on the rolls due to static alignment wherein the change in the toe angle can be determined;

FIG. 2B is a diagrammatic plan view illustrating the effect of axial wheel forces on the rolls due to static alignment wherein the change in the camber angle can be determined;

FIG. 3 is a schematic illustration of the toe and camber transducer demodulating circuits of the present invention;

FIG. 4 is a schematic diagram showing in greater detail the sum and difference circuits, the differentiating circuits and the regulating circuit of the present invention;

DESCRIPTION OF THE PREFERRED EMBODIMENT

Figure 5:
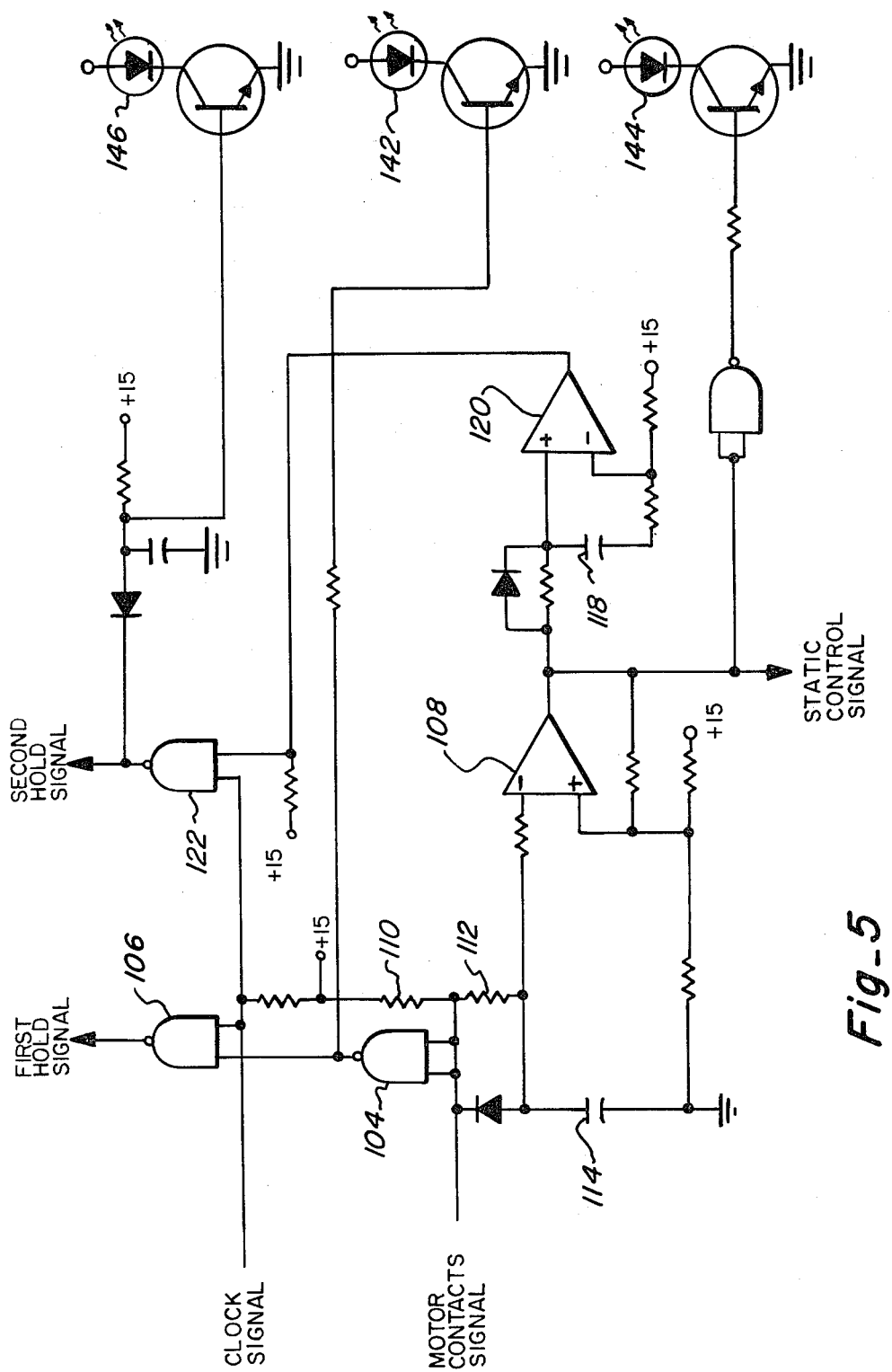
FIG. 5 is a schematic illustration of the timing circuit of the present invention.

In accordance with the present invention, a dynamic wheel aligner 10 is provided in combination with an apparatus for enabling an alignment operator to align the front wheels of a vehicle while the wheels are not rotating but using dynamically determined values of toe angle and camber angle. The dynamic wheel aligner 10 is described in detail in U.S. Pat. No. 3,187,440, issued June 8, 1965 to Merril et al. The disclosures set forth in this patent are hereby incorporated by reference to facilitate the understanding of the present invention.

Usually there is a wheel aligner 10 for each wheel and tire to be aligned. Since the present invention can be understood from a description of the alignment of a single wheel, the following discussion will be limited thereto. However, it is readily understood that both front wheels can be aligned using the present invention.

Generally, wheel aligner 10 includes a front roll 12 and a rear roll 14, as illustrated in FIG. 1. The wheel and tire of the wheel to be aligned are placed over and supported directly by the rolls 12, 14. A motor 16 drives one of the rolls 12, 14 and each of the rolls 12, 14 rotates about its longitudinal axis. The rolls 12, 14 are movable relative to one another in an axial direction in response to axial wheel forces imposed thereon. When the wheels are out of alignment with respect to the rolls 12, 14, axial tire forces are developed from the displacement of the tire tread in contact with the rolls 12, 14. Toe forces applied to the wheel, while the wheel is rotating on rolls 12, 14, will have axial components of force in the same direction. Camber forces applied to the wheel, while the wheel is rotating on the rolls 12, 14, will have axial components of force in opposite directions. The wheel aligner 10 is capable of movement by means of a toe servo system 18 and a camber servo system 20. As a consequence, the position of wheel aligner 10 can be adjusted to realign the rolls 12, 14 into parallel, centered relation effectively offsetting the axial forces of the tire. In other words, the rolls 12, 14 are repositioned so that their axes are aligned with the wheel axis. To provide this adjustment, the axial movement of the rolls 12, 14 is sensed by a front roll transducer 22 and a rear roll transducer 24, respectively. The axial wheel forces are directly proportional to the toe and camber angles. As a result, the signals outputted by the transducers 22, 24 are used to control the movement of the wheel aligner 10 by means of the toe servo system 18 or camber servo system 20, so that the axes of the rolls 12, 14 can be aligned with the wheel axis. The position of the wheel aligner 10 can also be sensed so that a visual display of the toe angle and camber angle can be provided to the alignment operator. The dynamic wheel aligner 10 thus provides a dynamic mode of determining the toe angle and camber angle of a wheel and tire.

Prior to the present invention, if the wheel was out of alignment, the alignment operator then made the adjustments to properly align the wheel while the tire and wheel are still rotating on the rolls 12, 14. The operator continued the adjustment until the visual indication of the toe and camber angles were within their desired specifications. The present invention obviates this requirement of rotating the wheel while the alignment is made. After the toe angle or camber angle are determined in the dynamic mode, a static mode is initiated and provided by the apparatus of the present invention.

In the static mode the rolls 12, 14 are not rotating. As the alignment operator makes the toe and camber angle adjustment while the rolls 12, 14 are not rotating, the rolls 12, 14 are displaced along their axes, just as in the dynamic mode, in response to the tire forces imposed thereon due to the aligning. However, a change in the toe angle because of the alignment is reflected by axial forces applied by the tire to the rolls 12, 14 in opposite directions, as depicted in FIG. 2A. This movement of the rolls 12, 14 is directly opposite that experienced in the dynamic mode in the determination of the dynamic toe angle where the rolls 12, 14 move in the same direction. A change in the camber angle because of the alignment is reflected by forces applied by the tire to the rolls 12, 14 in the same direction, as depicted in FIG. 2B. This movement of the rolls 12, 14 is directly opposite that experienced in the dynamic mode in the determination of the dynamic camber angle where the rolls move in opposite directions.

The foregoing relationship between axial roll movement during the static mode and the changes in the toe angle or camber angle have been shown by observation and proven by experimentation. Hence, the axial displacement of the rolls 12, 14 caused by the wheel and tire forces during the static mode are used to determine the toe and camber angle changes since the axial wheel forces produced as a result of the static alignment are directly proportional thereto. The present invention then combines the changes in toe angle and camber angle due to static alignment with their respective dynamically determined angles to provide a visual indication to the operator of the toe and camber angles of the wheel. Consequently, the operator can adjust the toe and camber angles until each is within its desired range.

Referring to FIG. 1, the front roll transducer 22 and the rear roll transducer 24, which sense the movement of their corresponding rolls, 12, 14 along each of their axes, output front and rear roll signals representative of the forces applied to the rolls 12, 14, respectively. A roll sum signal is outputted by sum circuit 26 and corresponds to the sum of the two roll signals. The difference in the two roll signals is obtained in difference circuit 28 and is defined as the roll difference signal. The roll sum signal and the roll difference signal are each applied to regulating circuit 30. Regulating circuit 30 couples the roll sum and roll difference signals to the toe and camber servo systems 18, 20, depending upon the mode in which the apparatus is operated. If the dynamic mode is activated, where the rolls 12, 14 are rotating, the regulating circuit 30 outputs the roll sum signal to the toe servo system 18. After completion of the dynamic mode and activation of the static mode, where the rolls 12, 14 are not rotating, the roll sum signal is no longer applied to the toe servo system 18. Rather, the roll difference signal is coupled to the toe servo system 18. In the dynamic mode, the regulating circuit 30 outputs the roll difference signal to the camber servo system 20. After completion of the dynamic mode and activation of the static mode, the camber servo system 20 is locked out or uncoupled from the regulating circuit 30. The wheel aligner 10 then cannot move in the camber plane, which is the plane formed by the pivoting of the wheel aligner 10 about a substantially horizontal axis located through the center axes of the wheel and tire, since the camber servo system 20 controls this pivotal movement and cannot be accessed in the static mode.

In the static mode when the difference between the front roll signal and rear roll signal is other than zero, the toe servo system 18 is activated. The roll difference signal is coupled to the toe servo system 18 through the regulating circuit 30. Regulating circuit 30 has been switched to the static mode by means of a static control signal outputted by timing circuit 32. Timing circuit 32 is responsive to the state of motor 16 of wheel aligner 10. Depending upon whether the motor is activated, in the dynamic mode, or deactivated, in the static mode, the timing circuit provides a control signal indicative of the motor state and the wheel aligning mode. The toe servo system 18 then causes the wheel aligner 10 to rotate about a substantially vertical axis, identical to the rotation in the determination of the dynamic toe angle, until the rolls 12, 14 are repositioned so that their axes are again aligned with the wheel axis which has been changed because of the alignment by the operator. This change in toe angle and subsequent movement of the wheel aligner 10 is sensed by a toe transducer circuit 34. The toe transducer circuit 34 outputs a toe angle signal which corresponds to the toe angle of the wheel relative to an absolute reference position, which is calibrated at zero degrees. The toe angle signal is applied to a toe differentiating circuit 36. Toe differentiating circuit 36 provides a feedback factor or function for converting the toe angle signal to a form suitable for summing with the roll sum signal outputted by sum circuit 26. The axial displacement of the rolls 12, 14 is proportional to the rate of change of the toe angle. This rate of change is defined as velocity feedback. Velocity feedback is provided to minimize unnecessary oscillation of the wheel aligner 10 by means of the toe or chamber servo systems 18, 20 in response to roll sum or roll difference signals outputted by the rolls 12, 14. As a consequence, the wheel aligner 10 moves more efficiently to the aligned position and stabilizes more quickly.

The toe angle signal outputted by the toe transducer circuit 34 is also applied to a pair of toe sample and hold circuits 38, 40. The output of each sample and hold circuit 38, 40 is coupled to a toe cancelling circuit 42. The toe cancelling circuit 42 outputs a cancelling signal indicative of the difference between the outputs of the two sample and hold circuits 38, 40. In the dynamic mode, the outputs of the sample and hold circuits 38, 40 are equal. Accordingly, the cancelling signal outputted by the cancelling circuit 42 is zero in magnitude. After the toe angle is determined in the dynamic mode, motor 16 is deactivated. The timing circuit 32 senses this deactivation and outputs a control signal which holds the dynamic toe angle then present at the output of sample and hold circuit 38. During the stopping or braking of the rolls 12, 14, a change occurs in the toe angle as a result of the toe servo system 18 changes. These changes arise because of pressure differentials present in the hydraulics which comprise a portion of the toe servo system 18 and because of where the tire is located on the rolls 12, 14 after rotation of the tire stops. A bent wheel, for example, will cause the tire to stop at a different location on the rolls 12, 14. This unwanted toe angle change is electronically removed from the dynamically determined toe angle. This is accomplished by inputting the toe angle signal, which changes during the stopping of the rolls 12, 14, to sample and hold circuit 40. As previously discussed, sample and hold circuit 38 outputs a toe angle signal corresponding to the dynamic toe angle. The changing toe angle signal and the held dynamic toe angle signal are applied to the toe cancelling circuit 42. Since the signals are now different, the cancelling signal outputted therefrom corresponds to the unwanted change in the toe angle. This cancelling signal is inputted to toe summing circuit 44. The toe angle signal from toe transducer circuit 34 is also inputted thereto. Toe summing circuit 44 sums these two signals and outputs a toe angle meter signal which corresponds to the toe angle of the wheel. The toe angle meter signal is coupled to a toe display meter 46 which provides a visual indication to the operator of the magnitude of the toe angle.

In the dynamic mode, the cancelling signal is substantially at zero voltage. The toe summing circuit 44 then outputs the toe angle signal outputted by the toe transducer circuit 34. After wheel aligner motor 16 is deactivated, the cancelling signal reflects the unwanted change in the toe angle. The unwanted toe angle change is summed by toe summing circuit 44 with the toe angle signal outputted by toe transducer circuit 34. The toe angle signal now includes the unwanted toe angle change and the dynamic toe angle. The toe summing circuit 44 removes the unwanted toe angle change and outputs a toe angle meter signal corresponding to the toe angle determined during the dynamic mode.

After a predetermined time delay, provided by timing circuit 32 in which the unwanted toe angle change has occurred, the outputs of both sample and hold circuits 38, 40 are now held. The output of cancelling circuit 42 is a constant cancelling signal corresponding to the unwanted toe angle change. During the static mode, the toe angle signal from toe transducer circuit 34 reflects the change in toe angle due to the operator alignment while the constant cancelling signal removes the unwanted toe angle change. The toe angle meter signal outputted by toe summing circuit 44 then corresponds to the toe angle of the wheel due to alignment.

Referring now to the camber angle alignment, in the dynamic mode, if the difference between the front roll signal and rear roll signal is other than zero, the camber servo system 20 is activated. The camber servo system 20 enables the wheel aligner 10 to rotate in order to align the axes of the rolls 12, 14 with the axis of the wheel. Camber transducer circuit 48 responds to the wheel aligner 10 movement and outputs a camber angle signal corresponding to the dynamically determined camber angle. Similar to the determination of the toe angle, the camber angle signal is applied to a camber differentiating circuit 50 which outputs a camber velocity feedback signal. The camber velocity feedback signal is combined with the roll difference signal and the resulting activating signal is coupled to the camber servo system 20.

When motor 16 of wheel aligner 10 is deactivated, the camber servo system 20 is uncoupled from the difference circuit 28 and the camber differentiating circuit 50 by the regulating circuit 30. After a predetermined time delay established by timing circuit 32, the roll sum signal inputted to camber sample and hold circuit 52 is held at the output thereof. The operator then begins the camber angle alignment. During the alignment, the held camber angle signal is applied to a camber cancelling circuit 54. Similar to the function of toe cancelling circuit 42, the camber cancelling circuit 54 outputs a roll sum signal which corresponds to the axial displacement of the rolls 12, 14 due to the camber alignment. As previously discussed, the axial displacement of the rolls 12, 14 in the static mode is proportional to the camber angle change. The axial displacement is converted to correspond to camber angle change by conversion circuit 56. The converted signal corresponding to the camber angle change is summed with the camber angle signal outputted by camber transducer circuit 48 in camber summing circuit 58. Since the camber angle signal outputted by camber transducer circuit 48 represents the dynamic camber angle, which has remained constant because the wheel aligner 10 does not rotate in the camber plane in the static mode, the sum thereof corresponds to the camber angle due to alignment. As a result, the alignment operator can align the wheel until camber angle meter 60, which visually indicates the magnitude of the camber angle, indicates a camber angle within the desired range.

Referring now to FIGS. 3-6, a further detailed discussion of the elements of the present invention is provided. Initially, the dynamic mode is considered. The motor contacts signal indicative of whether the motor 16 is on or off is applied to the regulating circuit 30 as illustrated in FIG. 4. When the motor is on or activated to drive the rolls 12, 14, the motor 16 contacts signal is essentially a logic LOW which closes dynamic camber switch 62 and dynamic toe switch 64.

The front roll signal outputted by the front roll transducer 22 is applied to a roll sample and hold circuit 66. The rear roll signal outputted by the rear roll transducer 24 is applied to a roll sample and hold circuit 68. The front and rear roll transducers 22, 24 are linear variable differential transducers (LVDTs) whose outputs are proportional to the axial displacements of their respective rolls 12, 14. The sample and hold circuits 66, 68 are monolithic sample and hold circuits commercially identified as Signetics LF 198/LF 298/LF 398. Whenever the clock signal from clock 70 is a logic HIGH, the roll signals then present on the input of the sample and hold circuits 66, 68 are gated to their respective outputs. Roll sample and hold circuits 66, 68 and the clock signal are included to assure an accurate representation of the axial movement of the rolls 12, 14 by providing relatively filtered roll signals without unwanted noise. The clock signal is normally 5 KHZ.

The roll signals are each coupled to the roll sum circuit 26 and the roll difference circuit 28. The roll sum signal outputted by amplifier 72 is coupled to resistive potentiometer 73 and then gated through dynamic toe switch 64. The roll difference signal outputted by amplifier 74 is coupled to resistive potentiometer 75 and then gated through dynamic camber switch 62. Resistive potentiometers 73, 75 permit gain adjustment of the front and rear roll signals. The roll sum signal corresponds to the axial displacement of the two rolls 12, 14 and is indicative of the wheel and tire forces on the rolls 12, 14 in the same direction. The roll difference signal corresponds to the axial displacement of the two rolls 12, 14 and is indicative of the wheel and tire forces on the rolls 12, 14 in opposite directions.

At the same time the roll signals are applied to the switches 62, 64 of the regulating circuit 30, velocity feedback toe and camber angle signals are also applied thereto. The velocity feedback toe and camber angle signals dampen the roll sum and difference signals to minimize oscillation of the wheel aligner 10 in its movement to align the rolls 12, 14 with the axis of the wheel and tire.

To generate the velocity feedback toe and camber angle signals, the toe transducer circuit 34 and the camber transducer circuit 48 monitor the movement of wheel aligner 10. FIG. 3 illustrates the transducer circuits 34, 48. The elements of each transducer circuit 34, 48 are the same for both the toe and camber angle determination. Each of the transducer circuits 34, 48 is responsive to the movement and position of the wheel aligner 10. A linear variable differential transducer (LVDT) 76 senses the position of the wheel aligner 10 in the toe plane relative to an absolute reference position of zero degrees toe angle. The toe plane is defined as a plane formed by the rotation of the wheel aligner 10 about a substantially vertical axis. Another transducer 76 senses the position of the wheel aligner 10 in the camber plane relative to an absolute reference position of zero degrees camber angle. The camber plane is defined as the plane formed by the rotation of the wheel aligner 10 about a substantially horizontal axis, which is perpendicular to the axis of rotation of the rolls 12, 14. Each transducer 76 outputs an AC signal, the amplitude of which is proportional to the displacement of the core of the transducer 76 from a null or zero reference position. The displacement of the transducer core is a function of the position of the wheel aligner 10.

The output of each transducer 76 is applied to individual amplifying networks 78, 80. Both amplifying networks 78, 80 receive an AC signal whose amplitude is proportional to the displacement of the transducer core. The amplitude of the AC signal inputted to the amplifying network 78 and the amplitude of the AC signal inputted to the amplifying network 80 are substantially equal when the wheel aligning apparatus is at zero degrees toe angle or zero degrees camber angle. As the wheel aligner 10 moves away from the zero degree positions, the amplitude of the signal applied to the amplifying network 78 changes inversely with respect to the amplitude of the signal applied to the amplifying network 80. That is, when the wheel aligner 10 is moved towards a positive camber or toe in, the amplitude of the signal inputted to amplifying network 78 increases while the amplitude of the signal inputted to amplifying network 80 decreases. When the wheel aligner 10 is moved towards a negative camber or toe out, the amplitude of the signal inputted to amplifying network 78 decreases while the amplitude of the signal inputted to amplifying network 80 increases.

The outputs of amplifying networks 78, 80 are applied to rectifying circuits 82, 84, respectively. The output of rectifying circuit 82 is a negative signal while the output of rectifying circuit 84 is a positive signal. The rectified signals are summed and this resulting signal is gated to an integrator network 86. Since the amplitudes of the rectified signals from rectifying circuits 82, 84 are opposite in sense or sign, whenever the two rectified signals are equal, the input to the integrating network 86 is zero volts. When the two rectified signals are not substantially equal indicating a wheel aligner 10 position other than zero degrees, a signal equal to the difference between the two rectified signals is generated. The integrating network 86 integrates the summed signal providing an output proportional to the toe angle or camber angle of the wheel.

Returning to FIG. 4, the toe angle signal and camber angle signal outputted by their respective transducer circuits 34, 48 are each inputted to their respective differentiating circuits 36, 50. Toe differentiating circuit 36 includes a differentiator 88 which differentiates the toe angle signal to provide the velocity feedback toe angle signal. Camber differentiating circuit 50 includes a differentiator 90 which differentiates the camber angle signal to provide the velocity feedback camber angle signal. The inverting amplifiers 92, 94 amplify and invert the velocity feedback toe angle signal and the velocity feedback camber angle signal, respectively. Resistive potentiometers 96, 98 permit adjustment of the magnitude of the velocity feedback signals. Through preselected movement of the potentiometer arms, the velocity feedback signals can be made greater or less positive or negative. Hence, the appropriate magnitude of velocity feedback signals is readily obtained. The velocity feedback toe angle signal is applied to toe dynamic switch 64 through resistive potentiometer 96 while the velocity feedback camber angle signal is applied to camber dynamic switch 62 through resistive potentiometer 98. The toe resulting signal provided by the combined velocity feedback toe angle signal and roll sum signal is amplified by the toe amplifying circuit 100. This amplified toe resulting signal controls the toe servo system 18 which includes a toe valve for regulating the toe servo system hydraulics and thereby the movement of the wheel aligner 10 about a substantially vertical axis. Similarly, the camber resulting signal provided by the combined velocity feedback camber angle signal and roll difference signal is amplified by the camber amplifying circuit 102. This amplified camber resulting signal controls the camber servo system 20 which includes a camber valve for regulating the camber servo system hydraulics and thereby the movement of the wheel aligner 10 about a substantially horizontal axis.

Figure 6:
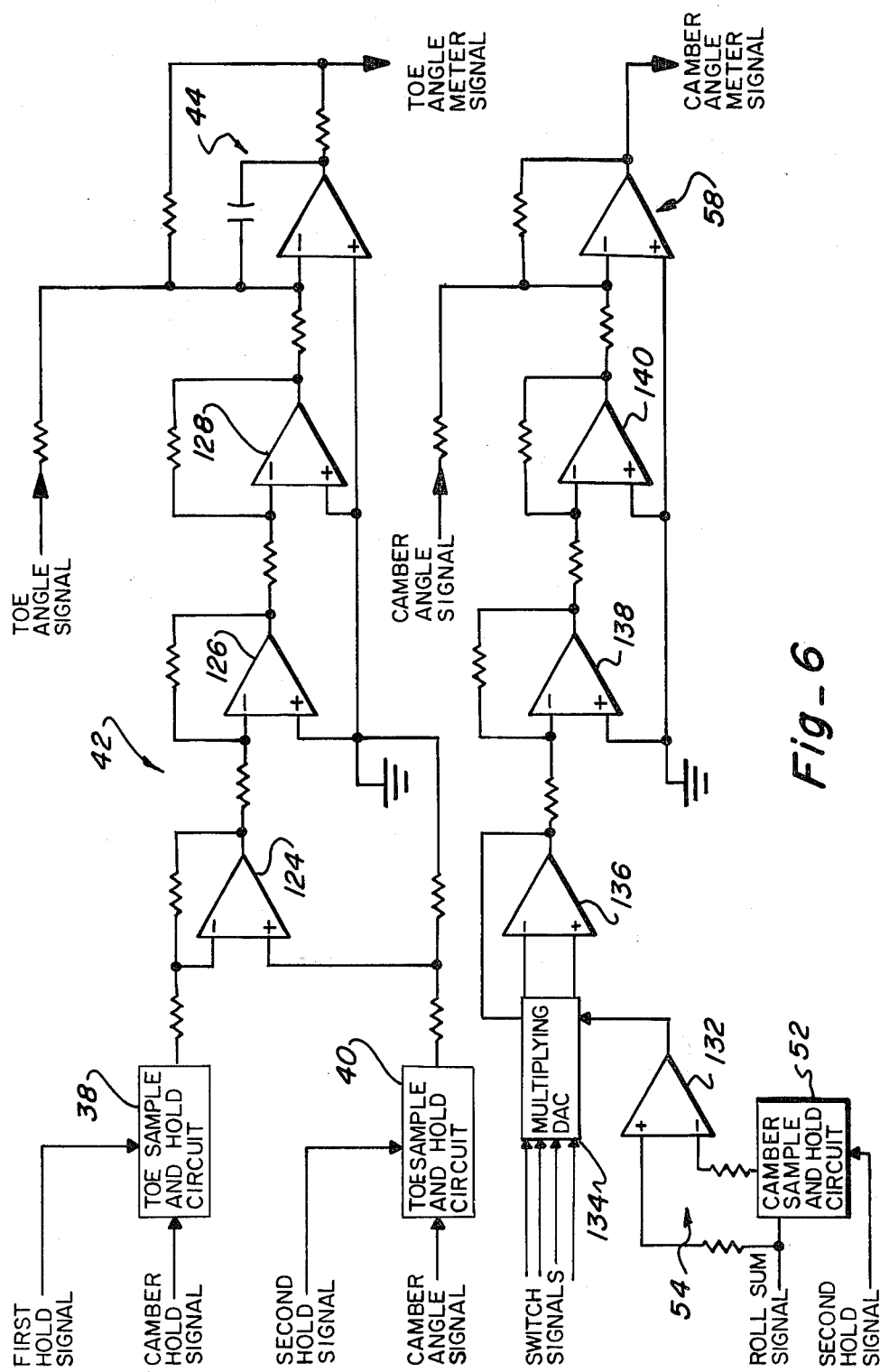
FIG. 6 is a schematic diagram showing in greater detail the toe, camber cancelling and summing circuits and the camber conversion circuit.

After the axes of the rolls 12, 14 are aligned with the wheel axis and a dynamic toe angle and a dynamic camber angle are provided, the motor 16 is shut off or deactivated. The motor contacts signal switches from a logic LOW to a logic HIGH. The logic HIGH opens dynamic camber and toe switches 62, 64. As depicted in FIG. 5, the motor contacts signal is also applied to both inputs of NAND gate 104. The two logic HIGH inputs produce a logic LOW output. This logic LOW is applied to NAND gate 106. The clock signal from clock 70 is the second input to NAND gate 106. Since one input to NAND gate 106 is continuously a logic LOW, the output thereof is a constant logic HIGH. The output of NAND gate 106 is defined as the first hold signal. As indicated in FIG. 6, the first hold signal is coupled to toe sample and hold circuit 38. Toe sample and hold circuit 38, as well as toe sample and hold circuit 40 and camber sample and hold circuit 52, are conventional monolithic sample and hold circuits available through Signetics. Toe sample and hold circuit 38 is arranged to hold the toe angle signal then on its output when a logic HIGH is applied by the first hold signal. This arrangement is opposite that of roll sample and hold circuits 66, 68 wherein a logic HIGH from the clock signal gates the input to the output of the sample and hold circuit 38. The toe angle signal inputted to sample and hold circuit 38 is provided by integrator network 86 of toe transducer circuit 34. As a result of the motor 16 deactivation then, a toe angle signal corresponding to the dynamic toe angle is held at the output of the toe sample and hold circuit 38.

Immediately after the motor 16 is deactivated, the rolls 12, 14 begin to stop rotating. Once the rolls 12, 14 have stopped rotating, the static mode is initiated by a static control signal having a logic LOW. The static control signal is outputted by comparator 108. When the motor 16 is deactivated, the motor contacts signal becomes a logic HIGH and capacitor 114 charges through resistors 110, 112. After a first predetermined time period, capacitor 114 is charged sufficiently such that the inverting input of comparator 108 is greater in magnitude than the noninverting input. The output thereof becomes a logic LOW. This logic LOW is applied to static toe switch 116 of the regulating circuit 30 to close the toe switch 116. The first predetermined time delay provides a sufficient time period so that the rolls 12, 14 are completely stopped before toe switch 116 is closed.

Prior to the alignment operator making any necessary adjustments in the toe angle or camber angle of the wheel after the rolls 12, 14 have stopped rotating, a second predetermined time delay is completed. The second predetermined time delay enables the toe servo system 18 to settle. As previously discussed, an unwanted toe angle change results from the changing from the dynamic mode to the static mode. The second predetermined time delay is initiated by the logic LOW at the output of comparator 108. This logic LOW enables capacitor 118 to discharge. After sufficient discharge, the noninverting input of comparator 120 becomes less in magnitude than the inverting input. A logic LOW is then outputted by comparator 120. This logic LOW together with the clock signal are applied to NAND gate 122 generating a continuously outputted logic HIGH. The output of NAND gate 122 is defined as the second hold signal.

During the second predetermined time delay while the second hold signal is a series of pulses changing from a logic HIGH to a logic LOW and the first hold signal is a constant logic HIGH, the cancelling circuit 42 by means of differential amplifier 124 outputs a cancelling signal which corresponds to the unwanted toe angle change. This occurs because toe sample and hold circuit 38 outputs the dynamic toe angle while the toe sample and hold circuit 40 outputs the dynamic toe angle including the unwanted toe angle change. The output of the differential amplifier 124 is applied to a pair of amplifiers 126, 128 serially connected and is then inputted to the toe summing circuit 44. The other input of toe summing circuit 44 is the toe angle signal from the toe transducer circuit 34. This toe angle signal includes the unwanted toe angle change which results from the changing to the static mode. The toe summing circuit 44 continuously removes or compensates for the unwanted toe angle change so that the toe angle meter signal outputted by the toe summing circuit 44 corresponds to the dynamic toe angle signal and does not include the unwanted toe angle change.

After the completion of the second predetermined time delay, the second hold signal becomes a logic HIGH so that the output of toe sample and hold circuit 40 constantly corresponds to the dynamic toe angle plus the unwanted toe angle change. Like toe sample and hold sample circuit 38, the logic HIGH of the second hold signal holds the output then present. The alignment operator then makes any necessary toe angle adjustments to place the toe angle within the desired specification. Referring to FIG. 4, the toe angle change by the alignment operator causes axial displacement of the front and rear rolls 12, 14. Unlike the determination of the dynamic toe angle, the difference between the forces acting on the rolls 12, 14 is used. The roll difference signal is coupled to resistive potentiometer 129 and then combined with the velocity feedback toe angle signal. Until this resulting signal is equal to zero, the toe servo system 18 enables movement of the wheel aligner 10. Resistive potentiometer 129 provides gain adjustment to the roll difference signal. The gain of the roll difference signal in the static mode is substantially increased over the gain present in the dynamic mode. This difference in gain is required because the rolls 12, 14 are no longer rotating thereby greatly reducing the magnitude of the inputs from the rolls 12, 14 to the transducers 22, 24. Just as in the dynamic mode, a velocity feedback toe angle signal is generated. But in the static mode, the output of the toe differentiating circuit 36 is provided by resistive potentiometer 130, rather than resistive potentiometer 96, to assure the proper magnitude of feedback.

The rotation of the wheel aligner 10 during alignment is sensed by the toe transducer circuit 34 and the toe angle signal outputted therefrom corresponds to the dynamic toe angle plus the static toe angle change, in addition to the unwanted toe angle change which occurred during the change from dynamic mode to static mode. This toe angle signal is inputted to the toe summing circuit 44 of FIG. 6. The other input to the toe summing circuit 44 corresponds to the unwanted toe angle change. The toe summing circuit 44, therefore, electronically removes the unwanted toe angle change so that the toe angle meter signal now outputted corresponds to the dynamic toe angle plus the change in the toe angle due to the alignment during the static mode. The toe angle meter signal is gated to the toe display meter to provide a visual indication to the operator of the magnitude of the toe angle.

We claim:

1. A wheel aligning apparatus for determining dynamically the toe and camber angles of a wheel while a pair of rolls are rotating and using these angles in the alignment of the wheel but while the rolls no longer rotate, the apparatus comprising:

first means for determining the dynamic toe angle and dynamic camber angle of the wheel while the rolls are rotating;

second means responsive to said first means for determining the change in the toe angle and the change in the camber angle due to alignment of the wheel while the rolls are not rotating, said second means including means for providing a conversion factor for use in outputting a signal corresponding to the change in camber angle; and third means responsive to said first means and said second means for combining the dynamically determined toe angle and the change in toe angle and for combining the dynamically determined camber angle and the change in camber angle to provide the toe angle and camber angle during alignment of the wheel.

2. A wheel aligning apparatus for use with a dynamic wheel aligner which determines a dynamic toe angle and a dynamic camber angle while two rolls are rotating, the apparatus comprising:

first means responsive to the dynamic wheel aligner for monitoring the axial displacement of the two rolls moving axially in opposite directions due to the wheel alignment while the rolls are not rotating and for monitoring the axial displacement of the two rolls moving axially in the same direction due to the wheel alignment while the rolls are not rotating;

second means responsive to said first means for determining the change in the toe angle and the change in the camber angle due to alignment of the wheel while the rolls are not rotating, said second means including means for compensating for unwanted changes in the toe angle after determination of the dynamic toe angle; and third means responsive to the dynamic wheel aligner and said second means for combining the dynamically determined toe angle and the change in toe angle and for combining the dynamically determined camber angle and the change in camber angle to provide the toe angle and camber angle during alignment of the wheel.

3. A wheel aligning apparatus for determining dynamically the toe and camber angles of a wheel while a front roll and a rear roll are rotating and using these angles in the alignment of the wheel but while the front and rear rolls no longer rotate, the apparatus comprising:

first means for determining the dynamic toe angle and dynamic camber angle of the wheel while the front and rear rolls are rotating, said first means providing a front roll signal indicative of the axial displacement of the front roll and a rear roll signal indicative of the axial displacement of the rear roll;

second means responsive to said first means for determining the change in the toe angle and the change in the camber angle due to alignment of the wheel while the rolls are not rotating, said second means taking the difference between the front roll signal and the rear roll signal to provide a roll difference signal for use in the determination of the change in the toe angle, said second means including timing means responsive to said first means for delaying the alignment of the wheel at least until the rolls have stopped rotating; and third means responsive to said first means and said second means for combining the dynamically determined toe angle and the change in toe angle and for combining the dynamically determined camber angle and the change in camber angle to provide the toe angle and camber angle during alignment of the wheel.

4. An apparatus, as claimed in claim 3, wherein: said second means sums the front roll signal and the rear roll signal to provide a roll sum signal for use in the determination of the change in the camber angle due to alignment.

5. An apparatus, as claimed in claim 3, wherein said second means includes:

feedback means responsive to said first means and outputting a velocity feedback toe angle signal for combining with the roll difference signal to aid in the determination of the toe angle of the wheel.

6. An apparatus, as claimed in claim 3, wherein said second means further includes:

regulating means responsive to said timing means for inhibiting the coupling of the roll difference signal to said first means until after a first predetermined time period is completed.

7. A method for aligning the toe angle of a wheel in which the wheel is rotatable upon a pair of rolls, comprising the steps of:

initiating a dynamic mode of wheel alignment;
determining the dynamic toe angle while the rolls are rotating;
holding the magnitude of the dynamic toe angle while the rotation of the rolls is being stopped;
initiating a static mode of wheel alignment;
compensating for unwanted toe angle changes which occur during the switching from the dynamic mode to the static mode;
aligning the toe angle of the wheel while the rolls are not rotating;
determining the change in the toe angle while being aligned; and
combining the change in toe angle while being aligned with the dynamic toe angle to determine the toe angle of the wheel.

8. A method for aligning the camber angle of a wheel of a vehicle in which the wheel is rotatable upon a pair of rolls, comprising the steps of:

determining the camber angle of the wheel while the rolls are rotating;
stopping the rotation of the rolls;
aligning the camber angle of the wheel while the rolls are not rotating;
summing the axial displacement of the rolls moving axially in the same direction due to the alignment;
converting the axial displacement of the rolls to camber angle change using a conversion factor; and
combining the change in camber angle while being aligned with the dynamic camber angle to determine the camber angle of the wheel.

9. A method for aligning a wheel of a vehicle using a dynamic wheel aligner having a servo system and a pair of rolls upon which the wheel rotates, comprising the steps of:

determining the dynamic toe angle and the dynamic camber angle while the rolls are rotating;
delaying first to enable the rolls to stop;
switching to the static mode of wheel alignment;
delaying secondly to permit the servo system of the dynamic wheel aligner to settle;
aligning the wheel while the rolls are not rotating;
monitoring the axial displacement of the rolls moving axially in opposite directions in the determination of the change in the toe angle due to the alignment;
monitoring the axial displacement of the rolls moving axially in the same direction in the determination of the change in the camber angle due to the alignment; and
combining the change in toe angle while being aligned with the dynamic toe angle to determine the toe angle of the wheel and combining the change in the camber angle while being aligned with the dynamic camber angle to determine the camber angle of the wheel.

10. A method, as claimed in claim 9, further including the step of: p1 compensating for an unwanted change in toe angle during the second delaying so that an accurate dynamic toe angle is provided.

11. A wheel aligning apparatus for determining dynamically the toe and camber angles of a wheel while a front roll and a rear roll are rotating and using these angles in the alignment of the wheel but while the front and rear rolls no longer rotate, the apparatus comprising:

first means for determining the dynamic toe angle and dynamic camber angle of the wheel while the front and rear rolls are rotating, said first means providing a front roll signal indicative of the axial displacement of the front roll and a rear roll signal indicative of the axial displacement of the rear roll;

second means responsive to said first means for determining the change in the toe angle and the change in the camber angle due to alignment of the wheel while the rolls are not rotating, said second means taking the difference between the front roll signal and the real roll signal to provide a roll difference signal for use in the determination of the change in the toe angle, said first means including means for adjusting the gain of the roll difference signal when the wheel is being aligned by the operator to amplify the relatively reduced signal amplitude of the roll difference signal due to the non-rotating front and rear rolls; and third means responsive to said first means and said second means for combining the dynamically determined toe angle and the change in toe angle and for combining the dynamically determined camber angle and the change in camber angle to provide the toe angle and camber angle during alignment of the wheel.

* * * * *

UNITED STATES PATENT AND TRADEMARK OFFICE
CERTIFICATE OF CORRECTION

PATENT NO. : 4,380,875

DATED : April 26, 1983

INVENTOR(S) : Lowell H. Erickson, Marcellus S. Merrill, David Chrisp

It is certified that error appears in the above—identified patent and that said Letters Patent is hereby corrected as shown below:

In the abstract, line 18, "tow" should read --toe--. Column 2, line 44, the first occurence of "The" should read --That--. Column 4, line 14, "Merril" should read --Merrill--; line 64, "are" should read --were--. Column 12, after the paragraph ending on line 31, insert the following 8 paragraphs:

--The operator can also align the camber angle of the wheel and tire. In contrast to the determination of the dynamic camber angle, the apparatus of the present invention makes use of the roll sum signal during camber angle static mode alignment. As previously discussed, in the static mode, the sum of the axial displacement of the rolls 12, 14 is proportional to the camber angle change. The roll sum signal is applied to the camber sample and hold circuit 52, as seen in Fig. 6. In the static mode, the second hold signal enables the roll sum signal then present at the completion of the second predetermined time delay to be held. The output of the camber sample and hold circuit 52 is then held constant and inputted to a first terminal of the differential amplifier 132 of the camber cancelling circuit 54. The changing roll sum signal caused by the camber angle change made by the alignment operator is inputted to a second terminal of differential amplifier 132. The output of the differential amplifier 132 corresponds to the change in the roll sum signal during alignment in the static mode.

The change in the roll sum signal is coupled to the conversion circuit 56 which includes a multiplying digital-to-analog converter (DAC) 134. Multiplying DAC 134 multiplies the change in the roll sum signal by a conversion factor so that the change in the roll sum signal corresponds to a change in camber angle. A number of switch signals are

UNITED STATES PATENT AND TRADEMARK OFFICE
CERTIFICATE OF CORRECTION

PATENT NO. : 4,380,875
DATED : April 26, 1983
INVENTOR(S) : Lowell H. Erickson, Marcellus S. Merrill, David Chrisp It is certified that error appears in the above—identified patent and that said Letters Patent is hereby corrected as shown below:

inputted to the multiplying DAC 134. The switch signals are provided by means of adjustable thumb wheel switches (not shown). The input to the multiplying DAC 134, therefore, can vary. The magnitude of the input is predetermined and depends upon the front wheel suspension of the vehicle whose wheel is being aligned. For example, in an upper and lower A-arm suspension having a pair of joints, a first joint is adjustable to permit camber angle change while a second joint is virtually a pivot point about which the wheel and tire move during alignment. The magnitude of the distance between the second joint and the bottom of the tire contacting the rolls 12, 14 is used to determine the value of the conversion factor.

The converted roll sum signal outputted by conversion circuit 56 corresponds to the change in camber angle and is amplified by amplifiers 136 and 138 and subsequently inverted by amplifier 140. This change in camber angle signal is then summed in the camber summing circuit 58 with the camber angle signal outputted by camber transducer circuit 48. The camber angle signal of camber transducer circuit 48 constantly corresponds to the dynamic camber angle since wheel aligner 10 has not rotated in the camber plane because the dynamic camber switch 62 was opened at the completion of the dynamic mode. The output of the camber summing circuit 58 corresponds to the camber angle due to alignment and includes the dynamically determined camber angle plus the change in camber angle which occurs during alignment by the operator. This camber angle meter signal is coupled to the camber display meter 60 which provides a visual indication to the operator of the camber angle of the wheel. Even though the discussion directed to the alignment of the camber angle was provided after the discussion of the toe

UNITED STATES PATENT AND TRADEMARK OFFICE
CERTIFICATE OF CORRECTION

PATENT NO. : 4,380,875

DATED : April 26, 1983

INVENTOR(S) : Lowell H. Erickson, Marcellus S. Merrill, David Chrisp

It is certified that error appears in the above—identified patent and that said Letters Patent is hereby corrected as shown below:

angle alignment, it is preferred that the camber angle be aligned before the static alignment of the toe angle. This sequence of alignment is preferred so that any change in the toe angle during the camber angle alignment is offset or taken care of during the subsequent toe angle alignment.

Although the camber angle change during alignment by the operator is determined by means of the roll sum signal, the camber angle change can also be determined in a manner similar to that provided in the determination of the toe angle change. That is to say, the roll sum signal could be applied to the camber servo system 20 and the movement of the wheel aligner 10 resulting therefrom used to determine the camber angle change. However, utilization of the roll sum signal provides an accurate determination of the camber angle change and the implementation thereof is much less complicated than by means of the movement of the wheel aligner 10 in the camber plane.

It is also understood that, in the dynamic mode, the output of differential amplifier 132 is essentially zero since the same input is applied to both the non-inverting and inverting terminals thereof. As a consequence, the output of camber summing circuit 58 reflects the camber angle signal outputted by camber transducer circuit 48. Similarly, in the dynamic mode, the output of differential amplifier 124 is essentially zero since the same input is applied to both the non-inverting and inverting terminals thereof. Hence the output of toe summing circuit 44 reflects the toe angle signal outputted by the toe transducer circuit 34.

To assist the alignment operator, a number of visual indicators are also provided. Referring to Fig. 5, when light-emitting diode (LED) 142 is lit, the present invention

UNITED STATES PATENT AND TRADEMARK OFFICE
CERTIFICATE OF CORRECTION

PATENT NO. : 4,380,875

DATED : April 26, 1983

INVENTOR(S) : Lowell H. Erickson, Marcellus S. Merrill, David Chrisp

It is certified that error appears in the above—identified patent and that said Letters Patent is hereby corrected as shown below:

is operating in the dynamic mode. After the first predetermined time delay during which the rolls 12, 14 have stopped rotating, LED 144 is lit thereby indicating that the static toe switch 116 is closed. After the second predetermined time delay during which the rolls 12, 14 have stopped rotating, LED 144 is lit thereby indicating that the static toe switch 116 is closed. After the second predetermined time delay during which the servo system is settled, LED 146 is lit indicating that the operator can now make the necessary toe and camber angle adjustments.

Based on the foregoing description of the present invention, a number of worthwhile advantages are readily discerned. An apparatus is provided in combination with a dynamic wheel aligner to enable an operator to align the front wheels of a vehicle while the wheels are not rotating but using dynamically determined wheel angles. The toe angle and camber angle of the wheel and tire are determined while they are rotating on rolls. The rotation of the rolls is stopped. The changes in the toe angle and camber angle due to alignment by the operator while the rolls are not rotating are combined with the dynamically determined toe and camber angles. A visual indication of the toe and camber angles is provided to the operator during alignment so that the proper adjustments are made. Wheel alignment during the static mode is particularly advantageous in vehicles which have a front wheel drive system. In front wheel drive vehicles, the space the alignment operator has in order to maneuver and make the wheel angle adjustments is reduced in comparison with the rear wheel drive vehicles. The present invention then minimizes the risks to the operator's safety since the tires and rolls are not rotating during the alignment. The cancelling circuit of the present

UNITED STATES PATENT AND TRADEMARK OFFICE
CERTIFICATE OF CORRECTION

PATENT NO. : 4,380,875

DATED : April 26, 1983

INVENTOR(S) : Lowell H. Erickson, Marcellus S. Merrill, David Crisp

It is certified that error appears in the above—identified patent and that said Letters Patent is hereby corrected as shown below:

invention removes any unwanted effects that the changeover from dynamic mode to static mode produces so that accurate toe and camber angles are displayed. A conversion circuit is also provided so that the change in camber can be determined for any make of vehicle using the sum of the axial displacements of the rolls. Increased gain is provided when the static mode is utilized so that sufficient signal strength is available for proper operation. In addition, velocity feedback signals are combined with the roll sum and roll difference signals to dampen the signals applied to the servo systems and thereby minimize unnecessary wheel aligner oscillations.

Although this invention has been described in detail with reference to a particular embodiment thereof, it is understood that variations and modifications can be effected within the spirit and scope of this invention.--

Column 14, Claim 10, line 51, delete "pl".

Signed and Sealed this

Fifteenth Day of November 1983

[SEAL]

Attest:

GERALD J. MOSSINGHOFF

Attesting Officer

Commissioner of Patents and Trademarks